(12) United States Patent
Watts et al.

(10) Patent No.: US 9,085,333 B1
(45) Date of Patent: Jul. 21, 2015

(54) BICYCLE SEAT

(71) Applicants: Christopher Watts, Roxbury, MA (US); Sarah Ellen Watts, Roxbury, MA (US)

(72) Inventors: Christopher Watts, Roxbury, MA (US); Sarah Ellen Watts, Roxbury, MA (US)

(*) Notice: Subject to any disclaimer, the term of this patent is extended or adjusted under 35 U.S.C. 154(b) by 0 days.

(21) Appl. No.: 14/257,609

(22) Filed: Apr. 21, 2014

Related U.S. Application Data

(60) Provisional application No. 61/813,779, filed on Apr. 19, 2013.

(51) Int. Cl.
| | |
|---|---|
| B62J 1/18 | (2006.01) |
| B62J 1/08 | (2006.01) |
| B62J 1/04 | (2006.01) |
| B62J 1/00 | (2006.01) |
| B62J 1/10 | (2006.01) |
| B62J 1/02 | (2006.01) |

(52) U.S. Cl.
CPC .... *B62J 1/08* (2013.01); *B62J 1/00* (2013.01); *B62J 1/007* (2013.01); *B62J 1/02* (2013.01); *B62J 1/04* (2013.01); *B62J 1/10* (2013.01)

(58) Field of Classification Search
CPC .................. B62J 1/08; B62J 1/04; B62J 1/00; B62J 1/10; B62J 1/007; B62J 1/02
USPC ............ 297/195.1, 195.11, 211, 215, 215.15, 297/313, 314
See application file for complete search history.

(56) References Cited

U.S. PATENT DOCUMENTS

| | | | | |
|---|---|---|---|---|
| 253,504 | A * | 2/1882 | Burley | 297/197 |
| 304,827 | A * | 9/1884 | Kelley | 297/204 |
| 477,277 | A * | 6/1892 | Smith | 297/196 |
| 489,501 | A * | 1/1893 | Rich et al. | 297/204 |
| 499,718 | A * | 6/1893 | Outler | 297/206 |
| 612,546 | A | 10/1898 | Leimburg | |
| 1,027,171 | A * | 5/1912 | Berry | 267/132 |
| 1,209,564 | A * | 12/1916 | Deem | 297/210 |
| 1,777,463 | A * | 10/1930 | Dearing | 297/313 |
| 2,395,346 | A | 2/1946 | Schwinn | |
| 2,770,287 | A * | 11/1956 | Christensen | 297/314 |
| 5,597,202 | A | 1/1997 | Andersen | |

(Continued)

OTHER PUBLICATIONS

How to Install a Pedersen Saddle from www.pedersenbicycles.com/saddle.pdf, Jun. 2, 2011.

(Continued)

*Primary Examiner* — Joshua J Michener
*Assistant Examiner* — Matthew Gitlin
(74) *Attorney, Agent, or Firm* — Altman & Martin; Steven K Martin

(57) ABSTRACT

A bicycle seat with a primary frame that is two parallel, horizontal springs with a vertical rear section and front section that curves upwardly and forwardly. Upper, central, and lower crossbars connect the front sections together. A universal ball and socket joint attaches a C-shaped secondary frame to the primary frame rear section. A flexible, non-elastic strap tensions the primary frame. One strap end is fixed to the upper crossbar, extends rearwardly through a slot in a tab on the secondary frame, and forwardly to a strap attachment at the primary frame front section. The strap tension is either adjustable or fixed. A shaped seat substrate is attached to the secondary frame, extending forwardly as a cantilevered surface. An optional resilient wedge fits between the strap and the seat substrate as a shock absorber. The seat substrate is covered by a seat cushion and a seat cover.

9 Claims, 4 Drawing Sheets

(56) References Cited

U.S. PATENT DOCUMENTS

| | | | |
|---|---|---|---|
| 6,626,490 B2* | 9/2003 | Williams et al. | 297/215.15 |
| 6,666,507 B1* | 12/2003 | Ringgard | 297/195.1 |
| 2001/0008348 A1* | 7/2001 | Nelson | 297/195.1 |
| 2004/0145222 A1* | 7/2004 | Shu | 297/195.1 |
| 2008/0169689 A1 | 7/2008 | Chien-Kuo | |
| 2014/0110980 A1* | 4/2014 | Attey | 297/215.16 |

OTHER PUBLICATIONS

Seat—Shaking the paradigm of equestrian saddles, Badenia Cycles blog, Feb. 18, 2011.

\* cited by examiner

BICYCLE SEAT

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to bicycles, more particularly, to shock-absorbing bicycle seats.

2. Description of the Related Art

Bicycle seats or saddles that are commercially available today achieve a number of things successfully. 1. They are stable enough to safely support the rider's weight while being light enough so as to not excessively increase the net weight of the bicycle. 2. They are shaped in a way that enables the rider to sit in a variety of positions depending on changing terrain or pitches that the rider may travel. 3. The most common shape of bicycle seats has an elongated front "horn" that the rider straddles and that serves several functions: (a) It allows the up and down motion of the rider's legs to move relatively unhindered. (b) It automatically centers a rider over the center of the seat post and therefore squarely over the frame of the bicycle during pedaling. (c) It acts as a secondary method of steering the bicycle along with the handlebars as it enables the rider to shift the vertical angle of the bicycle in relation to the road with the inner thighs.

While most seats are effective in these and other ways, they are generally framed by two fixed, rigid members on the underside that become the backbone of the seat and the main support of the rider's weight. These members are fastened to the bicycle frame by means of a clamp and rigid seat post that renders the seats utterly unmovable and inflexible. This rigidity causes a number of major problems:

(1) Whenever a rider passes over a bump or dip in the terrain, the rigid attachment transfers all the force and energy of the bump directly into the rider's posterior, which can sometimes cause brief but noticeable pain, depending on how he is positioned on the seat at the time. While there are examples of commercially available seats that have coil springs built in so as to absorb and lessen the severity of this force, these can noticeably increase the overall weight of the seat. The springs can also result in an annoying bouncing reaction for several seconds after the bump, causing the rider to bodily bounce up and down until the inertia has dissipated.

2) The up and down motion of the rider's legs while pedaling causes constant, repeating, and alternating pressure on the inner rear thighs. This results in added long term stress to the joints of the hips and lower back as the rider is forced to subtly twist his spine and lift his legs off and on the seat on the upstroke and downstroke, respectively.

3) The rigid seat attachment causes chafing on the skin, muscles, and subcutaneous tissue of the buttocks and upper/inner legs, especially on longer rides. Due to the nature of pedaling a bicycle, there is no way to avoid some degree of chafing and body rocking inherent in the use of today's standard, commercially available bicycle seats.

4) In men, the pressure from sitting on a bicycle seat for long periods of time can bruise or damage the structures of the perineum between the scrotum and the anus. This pressure may bruise a nerve called the ilioinguinal nerve, which is the sensory nerve supply to the scrotum and penis. This neuropraxia, or nerve bruising, will cause numbness and, in extreme cases, can cause erectile dysfunction.

BRIEF SUMMARY OF THE INVENTION

The present invention is a tensioned bicycle seat that is simultaneously yielding and supportive to the weight of the rider and the natural hip and leg movements associated with pedaling a bicycle. The seat has a number of components: a primary frame, a secondary frame, a universal joint, a strap, a seat substrate, a supportive wedge, and a seat cushion.

The primary frame is composed of two long springs that are generally horizontal and parallel to each other. Each spring has with a relatively straight, generally horizontal center section, an upward curve of approximately 90° to a generally vertical rear section and an approximately 270° curl at the front to a front section that curves forwardly. An upper crossbar, a center crossbar, and a lower crossbar connect the front sections.

The secondary frame is a generally C-shaped rod that is attached to the upper end of the primary frame rear section by the universal joint. The present configuration employs a ball and socket joint. The ball is attached to the secondary frame by a short neck. A ring acting as the socket is attached vertically between the primary frame rear sections. The neck extends through the socket such that the ball is outside of the primary frame and the C-shaped rod hangs over the primary frame. When the seat is under tension (described below), the joint allows the secondary frame to pivot vertically (pitch) and horizontally (yaw) relative to the primary frame.

The strap is composed of a flexible, non-elastic, high-strength material, such as nylon and tensions the primary frame. One end of the strap is fixed to the upper crossbar. The strap extends rearwardly, through a slot in a tab on the secondary frame, and forwardly to a strap attachment at the front section of the primary frame. In one configuration, the strap attachment is such that the strap tension is not adjustable. Before the strap is attached, the primary frame is compressed by pulling the secondary frame tab toward the front section of the primary frame, thereby pulling the ball against the socket. Then the strap is looped around a crossbar and sewn to itself.

Alternatively, the strap attachment is adjustable so that the tension of the strap can be adjusted. In one adjustable strap attachment, the strap loops over the center cross bar to the lower cross bar. The lower crossbar has a longitudinal slot for the strap and is mounted to rotate. A ratchet allows the lower crossbar to rotate in only one direction. The lower crossbar is rotated until the desired primary frame compression is reached.

A seat substrate is attached to the secondary frame. The seat substrate is permanently shaped to produce a comfortable and ergonomically supportive shape on the top surface. The seat substrate extends forwardly as a cantilevered surface. The upward levering thrust of the cantilevered surface is produced by the tension created by the combination of the primary frame being under compression and that force being transferred to the secondary frame and seat substrate by the strap.

Optionally, a wedge made of a resilient material fits between the strap and the seat substrate to operate as a shock absorber.

The seat substrate is covered by a seat cushion and a seat cover. The seat substrate only extends forwardly enough to support the buttocks and seat bones of the rider. The seat cushion extends forwardly beyond the end of the seat substrate and yields to pressure from the rider's genitalia to avoid hard pressure.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
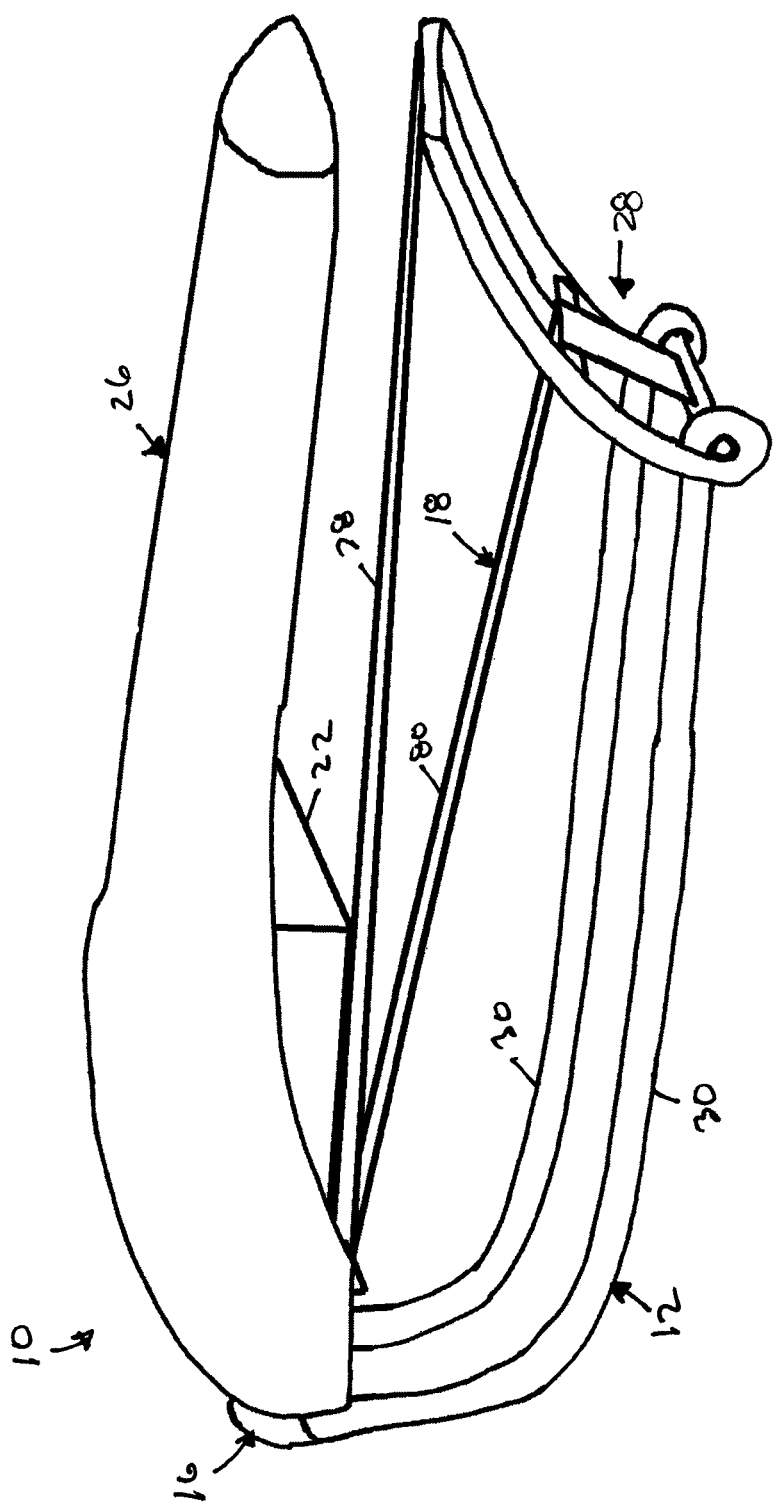
FIG. 1 is a perspective view of the bicycle seat of the present invention.
Figure 2:
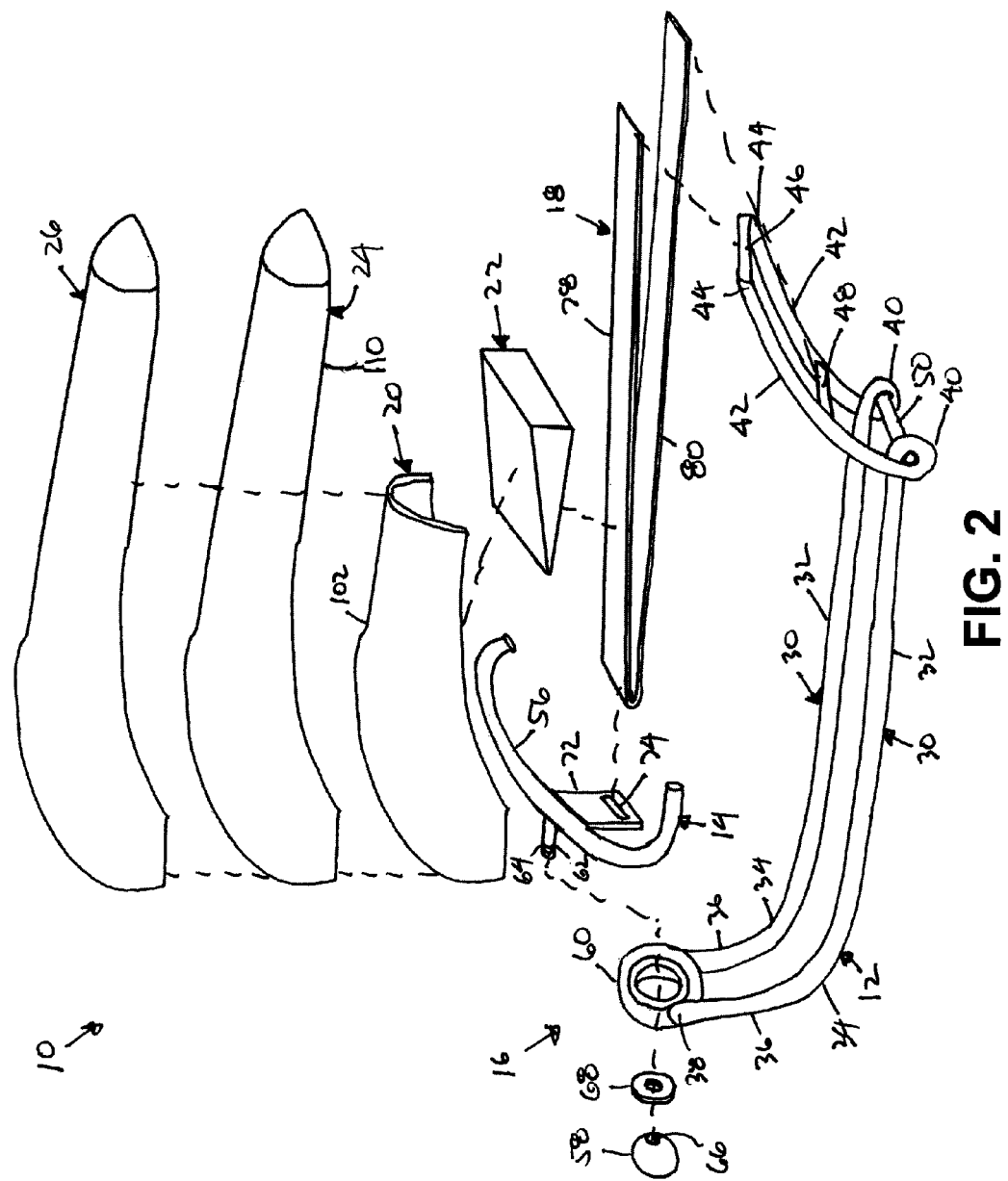
FIG. 2 is an exploded, perspective view of the seat of FIG. 1.

The present application hereby incorporates by reference in its entirety U.S. Provisional Patent Application No. 61/813,779, on which this application is based.

The present invention is a tensioned bicycle seat that functions in a manner similar to a hammock in that it is simultaneously yielding and supportive to the weight of the rider and the natural hip and leg movements associated with pedaling a bicycle. Compared to the majority of today's standard bicycle seats, it is more yielding to the side-to-side, horizontally pivoting motion that a rider makes with his legs while pedaling a bicycle, becoming naturally beneficial to the comfort of the rider. It is simultaneously more comfortable than most traditional bicycle seats due to the tensioned spring of its frame that supports the rider's weight while seated and simultaneously provides superior shock absorption. The dual rails that are incorporated into this design fit with existing universal seat post connectors so as to make this seat design easily adaptable to existing bicycle seat posts and frames, and thus becomes accessible to any bicycle rider. The rails of the seat are longer than those of a standard seat, providing a longer adjustability range of seat positions forward and backward, which enhances the ergonomic comfort for a wider range of riders as the design makes allowances for a greater variety of body proportions.

As shown in the figures, the bicycle seat 10 of the present invention has a number of components: a primary frame 12, a secondary frame 14, a pivoting joint 16, a strap 18, a seat substrate 20, a supportive wedge 22, and a seat cushion 24, and a seat cover 26.

The primary frame 12 is composed of two long springs 30 that are generally horizontal and parallel to each other. Each spring 30 is a rod composed of a material that is strong enough to support the rider's weight, and be sprung when under compression. Examples include steel and composites. The rod is generally round stock. However, other cross-sectional shapes are contemplated, including hexagonal stock and flat stock.

The spring 30 has with a relatively straight, generally horizontal center section 32 that, at the rear, curves upwardly approximately 90°, as at 34, to a generally vertical rear section 36. At the front of the center section 32 is an approximately 270° curl, as at 40, so that the rod extends generally upwardly as a front section 42. The front section 42 curves forwardly so that the end 44 of the front section 42 is more horizontal than vertical.

An upper crossbar 46 connects the front sections 42 at the upper end 44, a lower crossbar 50 connects the springs 30 at the curls, 40, and a center crossbar 48 connects the front sections 42 between the upper crossbar 46 and lower crossbar 50.

The present invention contemplates that the springs 30 can be made separately from two rods. The rods are bent to the correct shape and the upper crossbar 46 is welded or otherwise attached between the front sections 42. Alternatively, the springs 30 can be made from a single rod, where the upper crossbar 46 provides the continuity between the springs 30.

In either the two-rod or single-rod configuration, the center crossbar 48 is welded or otherwise attached between the two front sections 42. The lower crossbar 50 can be welded between the two springs 30 and/or can be captured within the 270° curls 40, as in FIG. 1.

The center sections 32 are longer than the frame of a traditional bicycle seat and thus reaches further forward and behind the seat post. This allows a greater range of forward and backward adjustment when clamping to the seat post.

The secondary frame 14 is a generally C-shaped rod 56. The rod 56 is composed of a rigid material that is strong enough to support the rider's weight. Examples include steel and composites. The rod 56 is generally round stock. However, other cross-sectional shapes are contemplated, including hexagonal stock and flat stock.

A pivoting joint 16 attaches the center of the secondary frame 14 to the upper end 38 of the primary frame rear section 36. The present configuration employs a ball and socket universal joint. A short neck 62 attaches the ball 58 to the C-shaped rod 56 in the general plane of the C-shaped rod 56. A ring acting as the socket 60 is welded or otherwise attached vertically between the primary frame rear sections 36, preferably at the ends 38 of the rear sections 36. The neck 62 extends through the socket 60 such that the ball 58 is outside of the primary frame 12 and the C-shaped rod 56 hangs over the primary frame 12.

The present invention contemplates any method of assembling the ball and socket. In the current configuration, the neck 62 is welded to the C-shaped rod 56. The other end of the neck 62 is threaded, as at 64. The neck 62 is put through the socket 60 and the ball 58, which has a threaded hole 66, is turned onto the neck threads 64. Optionally, a washer 68 composed of polytetrafluoroethylene (PTFE, one brand name of which is TEFLON) or other similar material is installed on the neck 62 outside the socket 60 before the ball 58 is turned onto the neck threads 64 in order to facilitate smooth motion of the joint 16.

Alternatively, the neck 62 is welded to the ball 58, put through the socket 60, and welded to the C-shaped rod 56.

When the seat 10 is under tension (described below), the joint 16 allows the secondary frame 14 to pivot vertically (pitch) and horizontally (yaw) relative to the primary frame 12.

Some riders prefer that the seat not pivot horizontally, but still wish the seat to pivot vertically for more comfort and shock-absorbing ability. The present invention contemplates that any mechanism that can accommodate this preference can be used.

Figure 5:
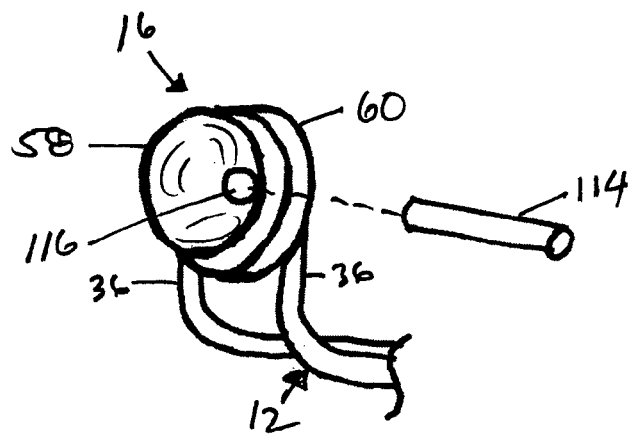
FIG. 5 is a detailed view of the joint showing the optional removable stabilizing pin.

In a first mechanism, shown in FIG. 5, a stabilizing pin 114 fits through a horizontal bore 116 in the joint ball 58. The pin 114 is longer than the bore 116, thereby extending from both ends, and the bore 116 is positioned in the ball 58 such that the pin 114 abuts the socket 60. When the secondary frame 14 attempts to pivot horizontally, the pin 114 against the socket 60 prevents the horizontal pivot. The pin 114 only prevents horizontal pivoting. The secondary frame 14 can still pivot vertically. Optionally, the pin 114 is removable so that the horizontal pivot can be restored.

Figure 6:
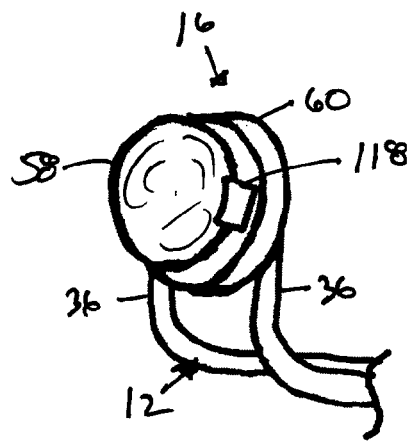
FIG. 6 is a detailed view of the joint showing optional stabilizing protrusions.

In a second mechanism, shown in FIG. 6, the ball 58 includes permanent horizontal protrusions 118. The protrusions 118 are positioned on the ball 58 such that the protrusions 118 abut the socket 60. When the secondary frame 14 attempts to pivot horizontally, the protrusions 118 against the socket 60 prevent the horizontal pivot. The protrusions 118 only prevent horizontal pivoting. The secondary frame 14 can still pivot vertically.

Figure 7:
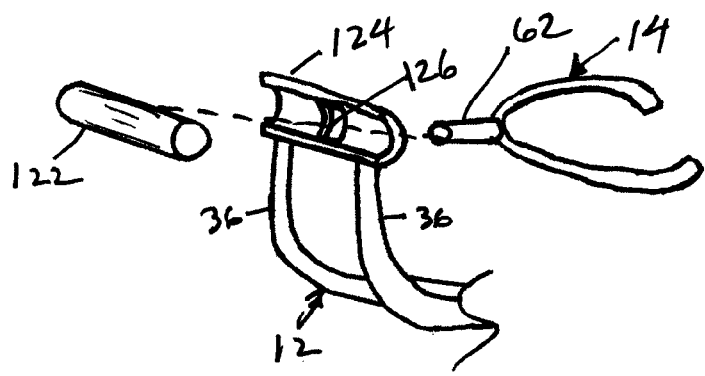
FIG. 7 is an exploded, perspective view of an alternative joint that prevents horizontal pivoting.

In a third mechanism, shown in FIG. 7, the pivoting joint 16 includes a horizontal cylinder 122 at the end of the neck 62, rather than a ball, and a horizontal, semicircular bearing surface 124, rather than a ring. The neck 62 extends through a vertical slot 126 in the bearing surface 124. The cylinder 122 pivots on the bearing surface 124 such that the secondary frame 14 can pivot vertically, but not horizontally.

A rigid tab 72 extends downwardly from the center of the C-shaped rod 56. The tab 72 has a transverse (horizontal) slot 74.

Figure 3:
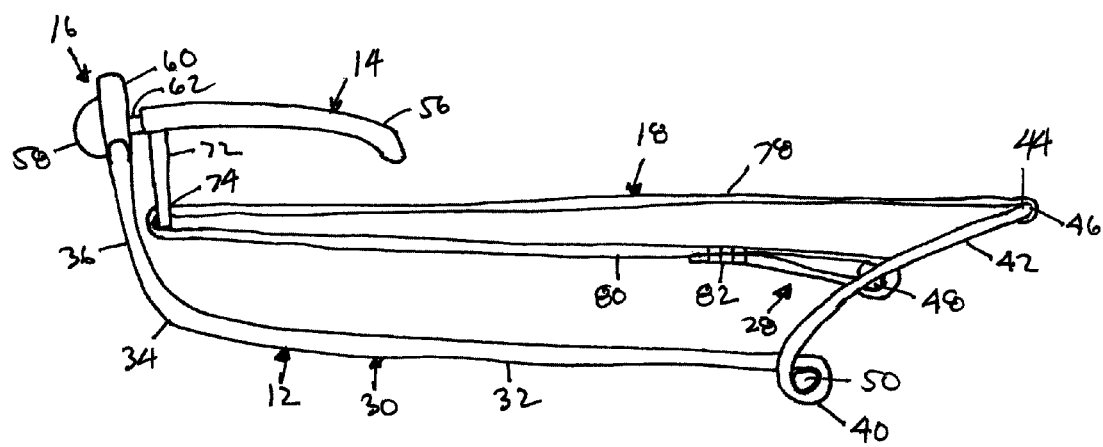
FIG. 3 is a side view of the primary frame, secondary frame, and strap without a strap tightening mechanism.

The strap 18 tensions the primary frame 12. It is composed of a flexible, non-elastic, high-strength material, such as nylon. As shown in FIG. 3, the strap 18 is fixed to the upper crossbar 46. The strap 18 extends rearwardly, as at 78, through the slot 74 in the secondary frame tab 70, and forwardly, as at 80, to a strap attachment 28 at the front section 42 of the primary frame 12.

In one configuration, the strap attachment 28 is not adjustable, so that that the strap tension is fixed. Before the strap 18 is attached, the primary frame 12 is compressed by pulling the secondary frame tab 72 toward the front section 42 of the primary frame 12, thereby pulling the ball 58 against the socket 60. Then the strap 18 is looped around either the center crossbar 48 or the lower crossbar 50 and sewn to itself, as at 82 in FIG. 3, in order to maintain the compression. This produces an upward and centering lift on the secondary frame 14 due to the leveraging effect of the combined force of the tensioned primary frame 12 on the tab slot 74, and the inelasticity of the strap 18, which is now under tension.

Alternatively, the strap attachment 28 is adjustable so that the tension of the strap 18 can be adjusted. The strap 18 is tightened to compress the primary frame 12 and pull the ball 58 against the socket 60, thereby producing an upward and centering lift on the secondary frame 14 due to the leveraging effect of the combined force of the tensioned primary frame 12 on the tab slot 74, and the inelasticity of the strap 18, which is now under tension.

The tighter the strap 18 is, the greater weight capacity the seat 10 has, thereby supporting heavier riders without collapsing.

Figure 4:
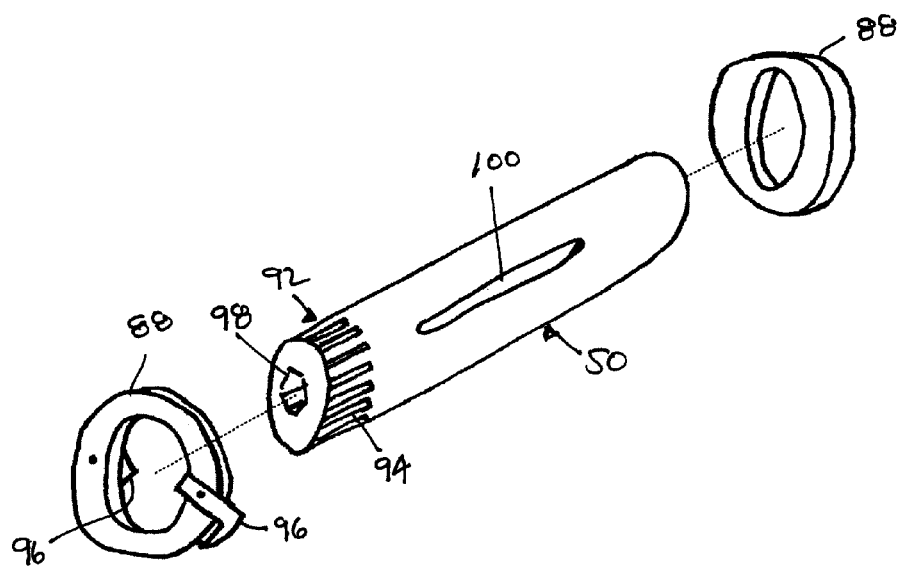
FIG. 4 is an exploded view of a strap tightening mechanism.

An adjustable strap attachment 28 is shown in FIG. 4. The strap 18 extends forwardly over the center cross bar 48 and to the lower cross bar 50, where there is a tightening mechanism 84. For the tightening mechanism 84, the lower crossbar 50 is mounted to the springs 30 so that it rotates, as at 86. For example, bearings 88 are mounted at the curl 40 and the lower crossbar 50 rotates in the bearings 88. There is a set of ratchet teeth 92 at one or both ends of the lower crossbar 50, and a corresponding pawl 96 mounted to the bearing 88. The ratchet teeth 92 can be either a toothed wheel at the end of the lower crossbar 50 or can be a series of depressions 94 in the surface of the lower crossbar 50, as in FIG. 4. A hex socket 98 at one end of the lower crossbar 50 facilitates turning the lower crossbar 50 to tighten. To use, the strap 18 is looped over the center crossbar 48 and through a longitudinal slot 100 in the lower crossbar 50. The lower crossbar 50 is rotated against the ratchet using a hex driver until the primary frame 12 has reached the desired compression. As the lower crossbar 50 rotates, the strap 18 loops around itself to retain the strap 18 in the slot 100. The tightening mechanism 84 can be loosened by releasing the pawl(s) 96, that is, pulling it away from the ratchet teeth 92.

Attached to the C-shaped rod 56 of the secondary frame 14 is a seat substrate 20 made of a material that is capable of being permanently shaped into the desired surface contour. Contemplated materials include thermo-formed plastics, such as a thermoplastic polycarbonate (one brand of which is LEXAN), and rigid foams. The seat substrate 20 is shaped to produce a comfortable and ergonomically supportive shape on the top surface 102.

The seat substrate 20 is attached only to the secondary frame 14 using whatever method is appropriate. Examples include hot glue, other adhesives, U-brackets, and other mechanical attachments.

The seat substrate 20 extends forwardly as a cantilevered surface. The upward levering thrust of the cantilevered surface is produced by the tension created by the combination of the primary frame 12 being under compression and that force being transferred to the secondary frame 14 and seat substrate 20 by the strap 18.

Optionally, wedged between the seat substrate 20 and the strap 18 is a wedge 22 made of a resilient material that is supportive but yielding. An example material is cast silicone rubber. The wedge 22 operates as a shock absorber. The shape of the wedge 22 is determined by the shape of the seat substrate 20 and the location of the strap 18 relative to the seat substrate 20. The wedge provides further support for the rider's weight when seated. The wedge 22 is held in place by friction and/or adhesive, such as a rubber cement. When the rider's weight is on the seat 10, the seat substrate 20 is compressed downwardly against the wedge 22, which in turn bears against the strap 18.

The seat cushion 24 is typically a foam sheet that is adhered to the seat substrate 20. The foam sheet 106 is composed of, for example, foam rubber.

A protective cover 26 overlays the foam sheet 106 and seat substrate 20 and is sewn into place. The cover 26 is composed of, for example, a weather-resistant and abrasion-resistant fabric.

The seat substrate 20 only extends forwardly enough to support the buttocks and seat bones of the rider. The seat cushion 24 extends forwardly beyond the end of the seat substrate 20, as at 110. The seat cushion 24 that extends beyond the seat substrate 20 yields to pressure from the rider's genitalia to avoid hard pressure on the rider.

Thus it has been shown and described a bicycle seat. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A bicycle seat comprising:
    (a) a primary frame comprised of a pair of parallel rods, each of the rods shaped with a relatively straight, generally horizontal center section, a rear end curving upwardly approximately 90° to a generally vertical rear section, a front end having an approximately 270° curl so that the rod extends generally upwardly as a front section, the front section curving forwardly from the curl such that the end of the front section is more horizontal than vertical, an upper crossbar extending between the front section ends, a lower cross bar extending between the curls, a center cross bar extending between the front sections between the upper cross bar and the lower cross bar;

(b) a secondary frame comprised of a generally horizontal, generally C-shaped rod, a neck extending horizontally from the center of the rod, and a tab extending downwardly from the center of the C-shaped rod, the tab having a horizontal slot;

(c) a pivoting joint attaching the neck to the primary frame at the rear sections, said pivoting joint permitting at least vertical pivoting of the secondary frame relative to the primary frame;

(d) a flexible, substantially inelastic strap attached to the upper crossbar, extending rearwardly and through the tab slot, extending forwardly to a strap attachment at the front section, the strap being under tension such that the primary frame is under compression;

(e) a contoured seat substrate attached to the secondary frame;

(f) a seat cushion attached to the seat substrate that extends beyond the seat substrate toward the front section; and (g) a seat cover overlaying the seat cushion.

2. The bicycle seat of claim 1 wherein the pivoting joint is a universal joint comprising a socket attached between the rear sections and a ball attached to the neck.

3. The bicycle seat of claim 2 wherein the universal joint further comprises a plastic washer on the neck between the ball and socket.

4. The bicycle seat of claim 2 further comprising a pin extending horizontally through the ball and abutting the socket.

5. The bicycle seat of claim 4 wherein the pin is removable.

6. The bicycle seat of claim 1 further comprising a wedge composed of a resilient material positioned between the strap and the seat substrate.

7. The bicycle seat of claim 1 wherein the strap attachment comprises looping the strap around the center crossbar or bottom crossbar and sewing the strap to itself.

8. The bicycle seat of claim 1 wherein the strap attachment includes a mechanism that permits adjustment of the strap tension.

9. The bicycle seat of claim 8 wherein the strap attachment includes a rotating lower crossbar with a longitudinal slot through which the strap extends and a ratchet mechanism that permits the lower crossbar to rotate in one direction unless released.

* * * * *